United States Patent Office 3,545,999

Patented Dec. 8, 1970

1

3,545,999
TRANSFER SHEET SYSTEM

Donald Firth, Skelmanthorpe, near Huddersfield, England, assignor to Datacopy Limited, Huddersfield, England, a British company No Drawing. Filed Dec. 11, 1967, Ser. No. 689,296
Claims priority, application Great Britain, Dec. 16, 1966, 56,377/66
Int. Cl. B41m 5/10
U.S. Cl. 117—36.4 3 Claims

ABSTRACT OF THE DISCLOSURE

The invention relates to transfer sheets formed of a backing sheet having coated on one side of thereof a layer of transfer composition which sheets are characterised in that they have a covering layer coated over at least part of the transfer layer. Optionally, these transfer sheets may be coated on the other side of the backing sheet with a layer of receptor composition.

The present invention relates to transfer sheets i.e. base sheets each carrying a layer of a pressure responsive transfer composition comprising colouring matter such that on application of pressure to a side of the sheet an image of the impress may be formed on a surface in contact with the transfer layer. In particular, the invention relates to transfer sheets of the type having on one side thereof a layer of a pressure sensitive transfer composition including colouring matter which when placed against a layer of a suitable receptor composition carried by an adjacent sheet the application of pressure, e.g. as with a typewriter key, to one of said sheets results in transfer of colouring matter from said transfer composition to said receptor composition.

With the presently known transfer sheet systems employing a layer of a transfer composition and a layer of a receptor composition, the transfer composition is usually coloured, for example, grey or blue, and whilst this material does not prevent the printing of matter on the side of the sheet carrying the transfer layer, the colour of the layer can make it difficult to read. Furthermore, in some transfer sheet systems, the transfer layer can rub off so that handling of the material results in a deterioration of the transfer layer and deposit of colouring matter from the transfer layer on objects e.g. hands, with which the layer comes into contact.

According to the present invention, there is provided a transfer sheet comprising a backing sheet carrying on one side thereof a transfer layer of a pressure responsive transfer composition comprising colouring matter and a carrier therefor, wherein at least a part of the exposed surface of the transfer layer is covered with a covering layer consisting substantially of a compound or composition, which compound or composition is acceptable as a carrier for said colouring matter in such a pressure responsive transfer composition.

The covering layer preferably includes a proportion of an opacifying agent to mask or modify the appearance of the colouring pigment in the transfer composition.

The present invention also includes a transfer sheet system comprising a first transfer sheet according to the present invention and a second receptor sheet carrying on one side a layer of a receptor composition, the receptor composition being such that, when the covering layer of said first sheet is placed adjacent the receptor layer of said second sheet and pressure is applied to one of said sheets, an image of the impress is formed on or in the receptor layer by colouring matter expressed from the transfer layer covered by said covering layer. In order to enable a transfer sheet of the present invention to be built up into a transfer sheet system comprising a stack of sheets, it is preferred that said transfer sheets comprise a backing sheet carrying on one side thereof, a transfer layer of a pressure responsive transfer composition, the exposed surface of which layer is covered at least in part, and preferably in toto by the covering layer, and carrying on the other side thereof a receptor layer of a receptor composition. If an exposed surface of a stack of such doubly coated transfer sheets arranged with the covering layer of each sheet except the last adjacent to the receptor layer of the next following sheet of the stack and if pressure is applied to the exposed surface of the first member of said stack, an image of the impress will be formed on or in the receptor layer of some or all of the sheets in the stack by colouring matter expressed from the transfer layer through the adjacent covering layer.

The present invention further includes a process for the manufacture of the transfer sheet of the invention, which process comprises coating a backing sheet with a layer of a pressure responsive transfer composition comprising a colouring pigment and a carrier therefor and thereafter applying to the surface of said layer a covering coating comprising a compound or composition which is acceptable as a carrier for said pigment in such a pressure responsive transfer composition.

In one embodiment of the invention the transfer sheets comprise a backing sheet carrying on one side thereof a transfer layer of a pressure responsive transfer composition comprising a resin soluble in a volatile organic solvent and a colouring pigment insoluble in said solvent, wherein at least a part of the exposed surface of the transfer layer is covered with a covering layer consisting substantially of a compound or composition, which compound or composition is acceptable as a carrier for said pigment in such a pressure responsive transfer composition. Such pressure resistant transfer compositions preferably also contain a proportion of an alkyl cellulose preferably ethyl cellulose and/or an alkyl hydroxyalkyl cellulose, preferably ethyl hydroxyethyl cellulose, and may also contain a proportion of a plasticiser and/or a filler and/or an opacifying agent.

The resin of the transfer composition may be an esterified maleic condensate resin. Examples of suitable resins are those commercially available under the trade names "Bedesol 76," which is a rosin maleic condensate esterified with pentaerythritol, "Crayvallac 502," which is a rosin maleic condensate esterified with glycerol. In the former case the presence of an alkyl cellulose and/or alkyl hydroxyalkyl cellulose in the transfer composition is preferred since such a cellulose compound acts as a plasticising agent to prevent the transfer layer from becoming brittle and breaking on folding the sheet. In the latter case, alkyl cellulose and/or alkyl hydroxyalkyl cellulose or another suitabe binding agent must be present since Crayvallac 502 alone has insufficient binding power for the purpose required.

A suitable plasticiser may be incorporated in the transfer composition such for example as that available under the trade name Howflex D.A.P. which is a phthalate ester of mixed aliphatic alcohols containing from 7 to 9 carbon atoms. Another suitable plasticiser is that available under the trade name Howflex C.S., which is cyclohexanol stearate and is preferably used in combination with Howflex D.A.P. Other suitable plasticisers are those available under the trade names Howflex S.B. which is a mixture of isomeric dimethyl cyclohexyl sebacate and Howflex S.A. which is a mixture of isomeric dimethyl cyclohexyl adipates. Further suitable plasticisers are the long chain amides e.g. Glokem E-2-O and Glokem E-2-S.

Typical fillers and/or opacifying agents for the transfer compositions of this embodiment are finely divided china clay and titanium dioxide and finely divided silica and typical inorganic pigments are Dark Blue, Red, Black or Green (Blythe Colours Ltd.) and Mannox Blue (Hardman & Holden Ltd.). The preferred solvents for the transfer composition of this embodiment are the lower aliphatic alcohols, in particular ethanol and isopropanol.

A typical transfer composition may be prepared by mixing 1 to 2 parts by weight of the resin with 2 to 5 parts by weight of the pigment. The mixture so formed may then be dispersed in its own weight of a volatile organic solvent, for example, white spirit and may be applied to a backing sheet by known coating means. The solvent is caused or allowed to evaporate to leave the transfer composition disposed as a layer on said backing sheet.

The cover layer for use on a transfer sheet according to one embodiment of the present invention comprises a resin which is soluble in a volatile organic solvent, preferably the solvent in which the resin of the transfer composition is soluble. The resin will usually be the same resin as that employed in the transfer composition and may be any of the resins mentioned above. The cover layer may also include a proportion of a finely divided inorganic filler e.g. silica and/or a plasticiser and/or a proportion of an alkyl cellulose or an alkyl hydroxyalkyl cellulose and/or a proportion of an opacifying agent. The akyl cellulose and alkyl hydroxyalkyl cellulose are preferably ethyl cellulose and ethyl hydroxyethyl cellulose respectively and the opacifying agent is preferably that commercially available under the trade name Tioxide R–TC5 or Tioxide A–HR. Generally, the composition of the cover layer will be identical to or approximate to the composition of the carrier component of the transfer composition but with the addition, if desired, of an opaicfying agent. The cover composition may be applied to the exposed surface of the transfer composition by means similar to those employed for the application of the transfer coating to the backing sheet.

The cover layer suitable for covering the typical transfer composition specified previously may include 1.0 to 1.5 parts by weight of solvent soluble resin, 0.25 to 0.75 part by weight of ethyl hydroxyethyl cellulose or ethyl cellulose together with 1.0 to 1.5 parts by weight of plasticiser. A proportion of up to 6.5 parts by weight of opacifying agent may be included in the composition.

A first type of receptor composition suitable for use in co-operation with a transfer layer comprises a resin as described above comprises a thermoplastic polyalkylene optionally together with an alkyl cellulose and/or alkyl hydroxyalkyl cellulose. The composition may further comprise a plasticiser and/or a filler and/or an opacifying agent. The thermoplastic polyalkylene is preferably one which has a softening point between 80 and 300° C. and preferably of not less than 100° C. A typical polyalkylene for use in the process of the present invention is polyethylene. The preferred cellulose compounds are ethyl cellulose and ethyl hydroxyethyl cellulose. The opacifying agent may be that commercially available under the trade name Tioxide AH–R, and the plasticiser may be one of those available under the trade names Howflex S.B. Glokem E–2O and Glokem E–2S.

A typical receptor composition may comprise 2.5 to 12 parts by weight of a binder containing the thermoplastic polyalkylene and 1 to 3 parts by weight of an opacifying agent and filler. The constituents are mixed and the resulting mixture is dispersed in its own weight of a volatile organic solvent, for example white spirit. The dispersion is applied by known coating means to a backing sheet so that evaporation of the spirit from the coating leaves a layer of the receptor composition on the sheet.

A second type of receptor composition suitable for use with a transfer composition comprising a resin as described above comprises a resin soluble in a volatile organic solvent together with an alkyl cellulose preferably ethyl cellulose and/or alkyl hydroxyalkyl cellulose preferably ethyl hydroxyethyl cellulose binder.

Generally, receptor compositions of this type will approximate to the transfer composition excluding the pigment or colouring matter thereof. Plasticisers and/or opacifying agents and/or fillers may also be included in the receptor compositions of this type, which plasticisers and/or opacifying agents and/or fillers may be of the above described types. The resin may be of any of those specified above with reference to the transfer composition and the solvent in which the resin is soluble may be the same as that in which the resin of the transfer composition is soluble.

The backing sheet employed in the transfer sheets of the invention may be made of for example paper, a textile fabric e.g. cotton, silk, synthetic silk, nylon or Terylene (trademark) or may be of a flexible sheet material for example the regenerated cellulose Cellophane (trademark), polyethylene terephthalate, nylon, cellulose ester, polyvinyl chloride, polyvinylidene chloride or polyvinyl chloride acetate copolymers.

Following is a description by way of example of transfer sheets and compositions in accordance with the present invention.

EXAMPLE 1

A transfer composition was made up from the following constituents:

Bedesol 76 resin—1,200 g.
Ethyl hydroxyethyl cellulose—500 g.
Howflex S.B.—450 ml.
Tioxide AH–R—250 g.
Carbon black Vulcan 3F—300 g.
Inorganic Dark Grey Pigment (Blythe Colour Works No. 5466)—2,100 g.
Silica (Gasil 23)—750 g.
Polyvinyl pyrrolidene (Albigen A)—700 ml.
Glokem E 20—1,000 g.
Antioxidant Annulex BHT—90 g.
Deodorant (Allen Stafford No. 1179)—35 ml.

The foregoing constituents were mixed and the resulting mixture was thoroughly dispersed in 10 litres of isopropanol. The resulting dispersion was applied to a sheet of backing paper and the solvent isopropanol was caused or allowed to evaporate thereby leaving a layer of the composition on said backing sheet.

The covering composition was made up to the following formula:

Bedesol 76 resin—1,200 g.
Ethyl hydroxyethyl cellulose—500 g.
Howflex S.B.—400 ml.
Silica (Gasil 23)—750 g.
Polyvinyl pyrrolidone (Albigen A)—500 ml.
Antioxidant (Annulex BHT)—90 g.
Glokem E–20—1,000 g.
Tioxide R CR2—625 g.

The constituents of the covering composition were thoroughly mixed and the resulting mixture was dispersed in 10 litres of isopropanol.

The sheet carrying the transfer composition was further coated on the surface of the transfer composition with the dispersion of the cover layer and the isopropanol solvent was again caused or allowed to evaporate to leave a layer of the cover composition disposed on the surface of the transfer layer.

A receptor composition was made up as follows:

Terpalyn A/9 (a mixture of modified polyturpenes currently marketed by the Hercules Powder Co.)—750 g.
Polyethylene AC 629—5,000 g.
Polyethylene AC 617—5,000 g.
Tioxide AHR—1,575 g.
China clay—450 g.
Glokem E 20—500 g.

After mixing these constituents were dispersed in 4 litres of white spirit and the resulting dispersion was applied by a known coating technique to a second sheet of paper. The white spirit in the coating was caused or allowed to evaporate and it was found that on placing the transfer sheet over the receptor sheet so that the cover layer was adjacent the receptor layer, an impression applied to the free face of the transfer sheet resulted in the transfer of a corresponding impression of colouring material to the receptor sheet.

The side of the transfer sheet bearing the transfer and cover layers has a generally pale grey appearance and it was possible to handle the sheet without colouring matter rubbing therefrom. Furthermore, it was possible to print such for example as conditions of sale, on this cover layer.

EXAMPLE 2

The procedure of Example 1 was repeated with the exceptions that the transfer composition was made up from the following constituents, Bedesol 76 resin—1,000 g.
Ethyl hydroxyethyl cellulose—500 g.
Howflex S.A.—450 ml.
Tioxide A–HR—2,500 g.
Vulcan 3F—400 g.
Dark Grey Blythe Colour Works No. M5466—2,100 g.
Gasil 23—750 g.
Albigen A—700 ml.
Glokem E20—1,500 g.
Annulex BHT—90 g.

and the covering composition was made from:

Bedesol 76—1,200 g.
Ethyl hydroxyethyl cellulose—500 g.
Howflex S.A.—400 ml.
Tioxide R–TC5—7,500 g.
Gasil 23—750 g.
Albigen A—500 ml.
Glokem E–20—1,500 g.
Annulex BHT—90 g.

The double-coated sheets obtained by the process of this example could be handled without colouring matter rubbing off, could be printed on the cover layer, and had very satisfactory transfer properties.

I claim:

1. A transfer sheet system comprising (a) a first sheet carrying a layer of a pressure-responsive transfer composition including a pigment carried by a resin base, and a layer of a covering composition comprising said resin base and an opacifying agent covering the exposed surface of the transfer layer to mask the appearance of the pigment in the transfer composition wherein said resin base is an esterified maleic condensate resin admixed with an alkyl cellulose, alkyl hydroxyalkyl cellulose, or mixtures thereof which functions as a plasticizing agent for said condensate; and (b) a second sheet carrying a layer of a receptor composition having a member selected from the group consisting of (i) said resin base; and (ii) thermoplastic polyalkylenes, admixed with an alkyl cellulose, alkyl hydroxyalkyl cellulose or mixtures thereof.

2. A transfer sheet system as claimed in claim 1 wherein the resin is selected from the group consisting of rosin maleic condensate esterified with pentaerythritol and rosin maleic condensate esterified with glycerol.

3. The transfer sheet system of claim 1 wherein the thermoplastic polyalkylene (ii) is polyethylene.

References Cited

UNITED STATES PATENTS

| | | | |
|---|---|---|---|
| 2,188,590 | 1/1940 | Bjorksten et al. | 117—36.4 |
| 3,203,832 | 8/1965 | Mino et al. | 117—36.3 |
| 3,226,134 | 12/1965 | Breidthardt | 117—36.3 |
| 3,340,086 | 9/1967 | Groak | 117—36.4 |

FOREIGN PATENTS

| | | | |
|---|---|---|---|
| 951,645 | 3/1964 | Great Britain | 117—36.4 |

MURRAY KATZ, Primary Examiner

U.S. Cl. X.R.

117—76, 138.8, 155